(12) United States Patent
Shi (10) Patent No.: US 9,820,083 B2
(45) Date of Patent: Nov. 14, 2017

(54) METHOD AND SYSTEM FOR DATA SHARING

(71) Applicant: JRD COMMUNICATION INC., Shenzhen, Guangdong (CN)

(72) Inventor: Zhen Shi, Guangdong (CN)

(73) Assignee: JRD COMMUNICATION INC., Shenzhen, Guangdong (CN)

( * ) Notice: Subject to any disclaimer, the term of this patent is extended or adjusted under 35 U.S.C. 154(b) by 0 days.

(21) Appl. No.: 14/915,212

(22) PCT Filed: Jul. 16, 2015

(86) PCT No.: PCT/CN2015/084239
§ 371 (c)(1),
(2) Date: Feb. 26, 2016

(87) PCT Pub. No.: WO2016/119413
PCT Pub. Date: Aug. 4, 2016

(65) Prior Publication Data
US 2016/0360343 A1    Dec. 8, 2016

(30) Foreign Application Priority Data
Jan. 28, 2015   (CN) .......................... 2015 1 0045161

(51) Int. Cl.
*H04B 7/00*   (2006.01)
*H04W 4/00*   (2009.01)
(Continued)

(52) U.S. Cl.
CPC ............. *H04W 4/008* (2013.01); *H04L 67/06* (2013.01); *H04W 4/00* (2013.01); *H04W 8/005* (2013.01);
(Continued)

(58) Field of Classification Search
CPC ... H04W 4/008; H04W 8/005; H04W 76/023; H04W 76/025; H04W 84/12; H04W 84/18
(Continued)

(56) References Cited

U.S. PATENT DOCUMENTS

2012/0242840 A1* 9/2012 Nakfour .............. G06K 9/6253
                                                         348/207.1
2014/0137202 A1    5/2014 Huang et al.
(Continued)

FOREIGN PATENT DOCUMENTS

CN    101807944 A    8/2010
CN    103312787 A    9/2013
(Continued)

*Primary Examiner* — Lee Nguyen
(74) *Attorney, Agent, or Firm* — Andrew C. Cheng (57) ABSTRACT

A method for data sharing is provided. The method includes: searching, by a first terminal, for multiple nearby terminals, and establishing wireless connections with the discovered nearby terminals, displaying on the display interface of the first terminal the nearby terminals already wirelessly connected to the first terminal and a transmittable file stored in the first terminal or the nearby terminals, and receiving by the first terminal a file-transmission command and transmitting or receiving a file to or from the nearby terminals. A system for data sharing is also provided. By the above means, operations based on the present disclosure are simple and fast, enabling interconnections of mobile terminals within a close range, a mobile terminal can transmit a file synchronously to multiple terminals for data transmission, and the terminals can share data therebetween, which thus profoundly enhances the user experience.

12 Claims, 5 Drawing Sheets

(51) Int. Cl.
*H04L 29/08* (2006.01)
*H04W 8/00* (2009.01)
*H04W 76/02* (2009.01)
*H04B 1/00* (2006.01)
*H04W 84/12* (2009.01)

(52) U.S. Cl.
CPC ....... *H04W 76/023* (2013.01); *H04W 76/025* (2013.01); *H04W 84/12* (2013.01)

(58) Field of Classification Search
USPC .................................................. 455/41.2, 410
See application file for complete search history.

(56) References Cited

U.S. PATENT DOCUMENTS

2014/0220937 A1 8/2014 Kang et al.
2015/0043484 A1* 2/2015 Jung ................... H04W 76/023
370/329

FOREIGN PATENT DOCUMENTS

CN 103812534 A 5/2014
KR 101352451 B1 1/2014

\* cited by examiner

METHOD AND SYSTEM FOR DATA SHARING

FIELD OF THE DISCLOSURE

The present disclosure relates to the field of communication technologies, and more particularly, to a method and system for data sharing.

BACKGROUND OF THE DISCLOSURE

With the development of communication technologies, mobile terminals are having more and more powerful functionalities. Nowadays, people use mobile terminals to communicate and exchange information. For different users within a close range, Bluetooth communication technology is commonly employed to perform data transmission. However, the data transmission based on Bluetooth communication technology requires the user to perform discovery manually for Bluetooth pairing, the operations of which are complicated and the transmission speed is slow, and only a point-to-point data transmission is supported. Hence, there is an urgent need to provide a method for achieving fast synchronous data sharing among different users, without the need of manual pairing, where a user may transmit data synchronously to multiple users so as to perform data transmission with each other.

SUMMARY OF THE DISCLOSURE

A method and a system for data sharing are provided, enabling interconnections of different mobile terminals within a close range, and meanwhile enabling data sharing with simple and fast operations.

To achieve the aforementioned features, a method for data sharing is provided according to an aspect of the present disclosure. The method comprises: searching, by a first terminal, for multiple nearby terminals, and establishing wireless connections with the discovered nearby terminals, where the first terminal may establish a point-to-point wireless connection with a nearby second terminal discovered so as to enable the first terminal to establish a wireless connection with a third terminal through a point-to-point wireless connection between the second terminal and the third terminal; displaying, by the first terminal, on its display interface the nearby terminals having been connected to the first terminal and a transmittable file stored in the first terminal or the nearby terminals; receiving, by the first terminal, a file-transmission command and transmitting or receiving the file to or from the nearby terminals, where the first terminal may perform face recognition on a user of each of the nearby terminals, and, if the user is successfully recognized, generate automatically the file-transmission command and transmit the file to the successfully recognized nearby terminal or receive the file from the nearby terminal.

The method may further comprise, before the step of searching by the first terminal for the multiple nearby terminals and establishing wireless connections with the discovered nearby terminals: receiving, by the first terminal, a registration command; if the registration command is successfully verified, performing, by the first terminal, the step of searching for the nearby terminals and establishing the wireless connections with the discovered nearby terminals.

The step of performing by the first terminal the face recognition on the user of each of the nearby terminals may comprise: performing, by the first terminal, face recognition on a face in a picture file saved in the first terminal, so as to determine whether the user face of each of the nearby terminals is present in the picture file; and the step of automatically generating the file-transmission command if the user is recognized successfully and transmitting the file to the successfully recognized nearby terminal may comprise: if the user face is present in the picture file, transmitting the picture file to the terminal held by the user with the face present in the picture file.

A method for data sharing is further provided according to another aspect of the present disclosure. The method comprises: searching, by a first terminal, for multiple nearby terminals and establishing wireless connections with the discovered nearby terminals; displaying, by the first terminal, on its display interface, the nearby terminals already wirelessly connected to the first terminal and a transmittable file stored in the first terminal or the nearby terminals; receiving, by the first terminal, a file-transmission command, and transmitting or receiving the file to or from the nearby terminals.

The method may further comprise, before the step of searching by the first terminal for the multiple nearby terminals and establishing wireless connections with the discovered nearby terminals: receiving, by the first terminal, a registration command; if the registration command is successfully verified, performing, by the first terminal, the step of searching for the nearby terminals and establishing the wireless connections with the discovered nearby terminals.

The step of searching by the first terminal for the multiple nearby terminals and establishing wireless connections with the discovered nearby terminals may comprise: establishing, by the first terminal, a point-to-point wireless connection with a nearby second terminal discovered, so as to enable the first terminal to establish a wireless connection with a third terminal through a point-to-point wireless connection between the second terminal and the third terminal.

The step of receiving by the first terminal the file-transmission command and transmitting or receiving the file to or from the nearby terminal may comprise: performing, by the first terminal, face recognition on a user of each of the nearby terminals, and, if the user is recognized successfully, generating automatically the file-transmission command and transmitting the file to the successfully recognized nearby terminal or receiving the file from the nearby terminal.

The step of performing by the first terminal the face recognition on the user of each of the nearby terminals may comprise: performing, by the first terminal, face recognition on a face in a picture file saved in the first terminal, so as to determine whether the user face of each of the nearby terminal is present in the picture file; and the step of automatically generating the file-transmission command if the user is recognized successfully and transmitting the file to the successfully recognized nearby terminal may comprise: if the user face is present in the picture file, transmitting the picture file to the terminal held by the user with the face present in the picture file.

A system for data sharing is further provided by the present disclosure. The system comprises a first terminal and multiple nearby terminals wirelessly connected to the first terminal, wherein a display interface of the first terminal may display the nearby terminals wirelessly connected to the first terminal and a transmittable file stored in the first terminal or the nearby terminals, and the first terminal is configured to receive a file-transmission command and transmit or receive the file to or from the nearby terminals.

The first terminal may comprise: a communication module connected to the nearby terminals and configured to receive a registration command and transmit or receive the file to or from the nearby terminals; a processing module connected to the communication module and configured to verify whether the registration command succeeds, and, when the registration command is successfully verified, search for the multiple nearby terminals and establish wireless connections with the discovered nearby terminals; a display module connected to the processing module and configured to display the nearby terminals already wirelessly connected to the communication module and the transmittable file stored in the first terminal or the nearby terminals.

The communication module may further be configured to establish a point-to-point wireless connection with a nearby second terminal discovered, so as to enable the first terminal to establish a wireless connection with a third terminal through a point-to-point wireless connection between the second terminal and the third terminal.

The processing module may further be configured to perform face recognition on a user of each of the nearby terminals, and to, if the user is recognized successfully, generate automatically a file-transmission command and transmit or receive via the communication module the file to or from the successfully recognized nearby terminal.

The first terminal may further comprise a camera connected to the processing module and configured to take a picture and save the picture file, wherein the processing module may perform the face recognition on a face in a picture file saved by the processing module, determine whether the user face of each of the nearby terminals is present in the picture file, and, if the user face is present in the picture file, transmit via the communication module the picture file to the terminal held by the user with the face present in the picture file.

By the aforementioned solutions, beneficial effects of the present disclosure follow as below: distinguished from the prior art, the present disclosure uses a first terminal, which is successfully registered, to search for multiple nearby terminals and establish wireless connections with the discovered nearby terminals, and proceeds to display on a display interface of the first terminal the nearby terminals already wirelessly connected to the first terminal and a transmittable file stored in the first terminal and the nearby terminals, and the first terminal may, when receiving a file-transmission command, transmit the file to the nearby terminals, in addition, the first terminal may also receive the file from the nearby terminals. Operations based on the present disclosure are simple and fast, enabling interconnections of mobile terminals within a close range, and a terminal can transmit files synchronously to multiple terminals within the system for data sharing, thereby profoundly enhancing the user experience.

DETAILED DESCRIPTION OF THE DISCLOSURE

To render the technical problems to be solved, technical solutions and beneficial effects of the present disclosure more definite and unambiguous, hereinbelow a detailed description will be made on the present disclosure with reference to the accompanying drawings and embodiments. It should be appreciated that the specific embodiments described herein are used merely to illustrate but not to limit the present disclosure.

The prior art used for data sharing among the mobile terminals held by different users within a close range tends to be the Bluetooth technology, which requires operations of discovery and pairing of terminal devices, where the operations are complicated and cumbersome, resulting in a poor user experience. Embodiments of the present disclosure provide a method and system for data sharing, which enables a visualized and simplified way to achieve interconnections among different mobile terminals within a close range, without the need of setting up routers or complex networks, and can perform data sharing at the background of the system. This solution may be combined with face-recognition technologies, thereby obviating the need of user's manual operations and automatically establishing interconnections among different mobile terminals relying solely on user face recognition.

Figure 1:
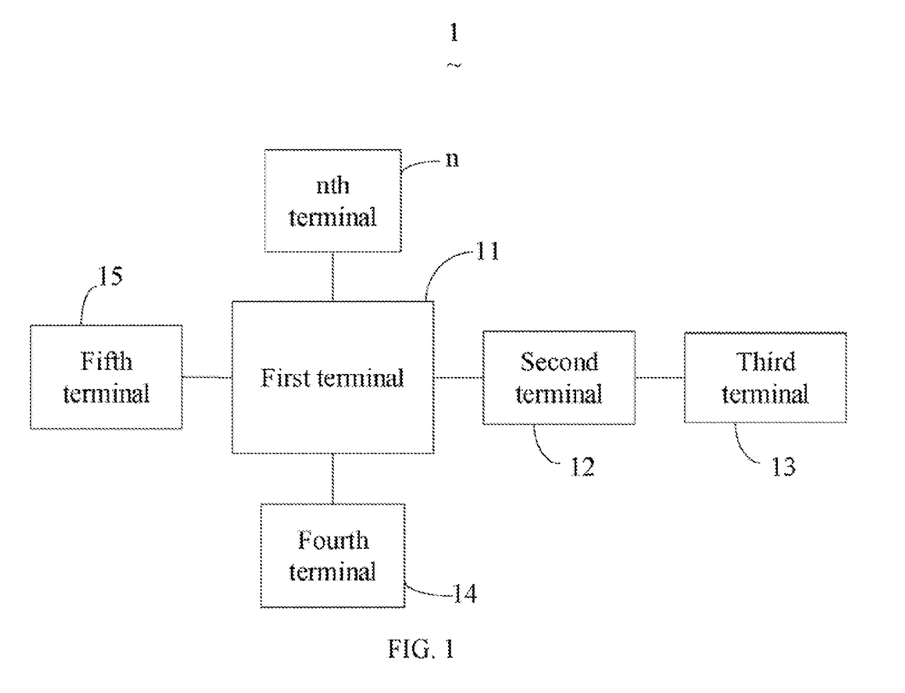
FIG. 1 is a block diagram illustrating a first embodiment of a system for data sharing according to the present disclosure.

Referring now to FIG. 1, a block diagram illustrating a first embodiment of a system for data sharing according to the present disclosure is shown. As is shown in FIG. 1, a system 1 for data sharing disclosed by this embodiment comprises a first terminal 11 and multiple nearby terminals wirelessly connected to the first terminal 11, where the multiple nearby terminals may comprise a second terminal 12, a third terminal 13, . . . , and a nth terminal. The terminals may be a smart phone, a notebook computer, an Ipad or a like smart mobile device. In this embodiment, the first terminal 11 may set up directly point-to-point wireless connections with the second terminal 12, the third terminal 13, . . . , and the nth terminal, respectively, or the first terminal 11 may set up a point-to-point wireless connection with the second terminal 12, and proceed to establish a wireless connection with the third terminal 13 through a point-to-point wireless connection between the second terminal 12 and the third terminal 13. In other embodiments, the first terminal 11 may wirelessly connect to other nearby terminals via any one or more of the nearby terminals, as long as data communication can be ensured. Hence, the first terminal 11 may perform data communication with even more distant nearby terminals.

The wireless connections mentioned in this embodiment may refer to a WIFI Direct connection. A WIFI Direct connection is a technology allowing wireless network devices to interconnect, transmit data or share applications, without wireless routers. It permits wireless devices to interconnect by a point-to-point manner, and also enables multiple devices to interconnect synchronously. In addition, the WIFI Direct standards are supported on all Wi-Fi devices, thus the Wi-Fi devices with different standards can interconnect directly. And using the WIFI Direct technology to perform data transmission among different devices may provide a further enhance of transmission speed and transmission distance, compared with Bluetooth technology. Additionally in other embodiments, the wireless connection may also comprise a Wi-Fi connection, a Bluetooth connection or other modes of wireless connection. The first terminal 11 and the nearby terminals in this embodiment all support the WIFI Direct function.

The first terminal 11 may receive a registration command. After the registration command is successfully verified (herein construed as the successful registration of an account), the nearby terminals which are successfully registered in the system 1 and support the WIFI Direct function can all be discovered by the first terminal 11, which may then establish wireless connections with the discovered nearby terminals. It should be noted that, herein, both the first terminal 11 and the nearby terminals need to be successfully registered in the system 1. If not, a terminal not registered cannot establish wireless connections with the terminals having been successfully registered in the system 1. Thus, information leakage can be avoided caused by the inadvertent connections of other irrelevant terminals.

A display interface of the first terminal 11 may display the nearby terminals connected wirelessly to the first terminal 11 and a transmittable file stored in the first terminal 11 or the nearby terminals. In this embodiment, the nearby terminals and the transmittable file are displayed as figures on the display interface of the first terminal 11, enabling operations to be visualized and simplified. The first terminal 11 may receive a file-transmission command to send the file to the nearby terminals, or may receive the file from the nearby terminals. The display interface of the first terminal 11 may display any one of a device name, a device type, a user avatar or nickname of each of the nearby terminals. For example, the nearby terminals wirelessly connected to the first terminal 11 and displayed on the display interface of the first terminal 11 may comprise the second terminal 12, the third terminal 13 and the fourth terminal 14. In addition, the display interface of the first terminal 11 may further display a transmittable file A stored in the first terminal 11 and a transmittable file B stored on the fourth terminal 14. If the first terminal 11 receives a command of transmitting file A, then the first terminal 11 may transmit the file A synchronously to the second terminal 12, the third terminal 13 and the fourth terminal 14. In other embodiments, the user may also select on the display interface of the first terminal 11 one or more of the second terminal 12, the third terminal 13 and the fourth terminal 14, and proceed to transmit the file A solely to the selected terminal. In addition, the first terminal 11 may also receive the file B transmitted from the fourth terminal 14.

It should be noted that, herein, the role of the first terminal 11 of this embodiment in the system 1 is similar to that of a repeater, and any one nearby terminal in the system 1, if enabled with the WIFI Direct function, may realize the function of the first terminal 11.

Based on system 1 for data sharing disclosed by this embodiment, when the first terminal 11 is successfully registered, it may search for and automatically discover the nearby terminals which also support the WIFI Direct function, establish connections with these nearby terminals, proceed to check the user pictures and device types of the nearby terminals, and transmit a file to the nearby terminals. Therefore, when one is participated in group activities, for example, travelling out with friends, and needs data transmission for group sharing, then he may employ the system for data sharing that is disclosed by the current embodiment to transmit data to the mobile terminals of his friends or to receive a data file from his friends, thereby enabling data sharing among mobile terminals without the need of establishing complex network connections.

Figure 2:
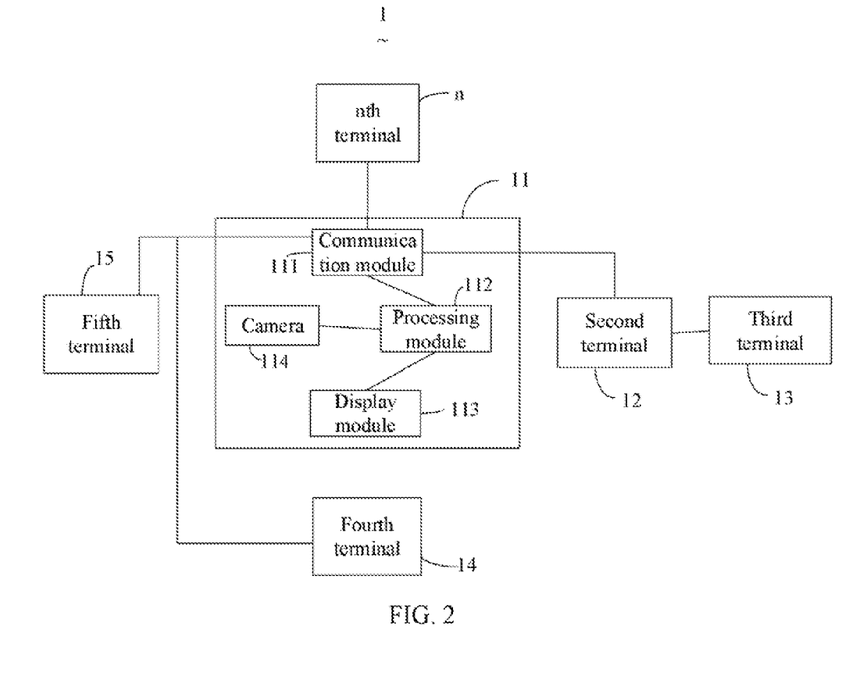
FIG. 2 is a block diagram illustrating a second embodiment of a system for data sharing according to the present disclosure.

Referring now to FIG. 2, a block diagram illustrating a second embodiment of a system for data sharing according to the present disclosure is shown, where FIG. 2 will be described on basis of FIG. 1. The system 1 for data sharing disclosed by this embodiment comprises the first terminal 11 and the nearby terminals connected wirelessly to the first terminal 11.

In this embodiment, the first terminal 11 comprises a communication module 111, a processing module 112, a display module 113 and a camera 114. The processing module 112 is connected to the communication module 11, the display module 113 and the camera 114, respectively.

The communication module 111 is connected to the nearby terminals, and configured to receive a registration command and transmit or receive a file to or from the nearby terminals. In addition, the communication module 111 is further configured to establish a point-to-point wireless connection with the nearby second terminal 12 discovered, and proceed to establish a wireless connection with the third terminal 13 through a wireless connection between the second terminal 12 and the third terminal 13. The processing module 112 may be configured to verify whether the registration command succeeds, and to, after the registration command is successfully verified, search for nearby terminals and establish wireless connections with the discovered nearby terminals. Further, the processing module 112 may perform face recognition on a user face of each of the nearby terminals, and, if the user face is recognized successfully, generate automatically a file-transmission command and transmit or receive via the communication module 111 a file to or from the successfully recognized nearby terminal. The display module 113 may be configured to display the nearby terminals already wirelessly connected to the communication module 111 and a transmittable file stored in the first terminal 11 or the nearby terminals. The camera 114 may be configured to take a picture and save the picture file. The processing module 112 may further perform face recognition on a face in the picture file saved by the processing module 112, and determine whether the user face of each of the nearby terminals is present in the picture file, and, if the user face is present in the picture file, transmit via the communication module 111 the picture file to the terminal held by the user with the face present in the picture file.

Hereinbelow, application scenarios of the current embodiment will be illustrated by examples. The system 1 for data sharing comprises the first terminal 11 and the nearby second terminal 12, the third terminal 13 and the fourth terminal 14. The first terminal 11, the second terminal 12, the third terminal 13 and the fourth terminal are held by users A, B, C and D, respectively. The communication module 111 of the first terminal 11 is in a point-to-point wireless connection with the second terminal 12, and the second terminal 12 is in a point-to-point wireless connection with the third terminal 13, which implies that the first terminal 11 actually sets up a wireless connection with the third terminal 13 via the second terminal 12. The first terminal 11 is in a point-to-point wireless connection with the fourth terminal 14. Furthermore, the display module 113 of the first terminal 11 displays any one of a device type, a device name or a registered nickname or picture of each of the second terminal 12, the third terminal 13 and the fourth terminal 14. Herein, the user's photo as the picture of the registered account is taken as an example. The user A may utilize the camera 114 of the first terminal 11 to take a photo of users B and C, and save the picture file taken. Hence, the picture file only contains the faces of B and C but not the face of D. The processing module 112 of the first terminal 11 may verify the faces of the user pictures of the second terminal 12, the third terminal 13 and the fourth terminal 14 that are displayed on the display interface of the first terminal 11. If a face is successfully recognized (herein construed as that the processing module 112 recognizes that only the faces of users B and C are contained in the picture file, while the face of user D is not), then a command of transmitting the picture file will be generated automatically, and the picture file will be transmitted synchronously to the second terminal 12 and the third terminal 13, but not to the fourth terminal 14 held by the user D. It should be noted that, the "be successfully recognized" mentioned herein implies that a verification standard is preset in the first terminal 11. For example, if the similarity is of 90%, then the face is successfully recognized. In addition, the camera 114 of the first terminal 11 may also take the picture and save the picture file before the processing module 112 again uses the camera 114 to observe the user faces of the nearby terminals to determine whether the user faces are present in the picture file. If the face is present in the picture file, then the processing module 112 may generate a command of transmitting the picture file, and transmit via the communication module 111 this picture file to the terminals held by the user with the face present in the picture file, thus enabling a timely browse of the picture file after it is taken, obviating the need for the user to manually search for the device of the object to which the file needs to be transmitted and the need for pairing. Hence, face recognition technology is consequently employed to intelligently share the picture file to the photographed object user in time. In other embodiments, the user can also operate manually. For example, the user may select on the display interface of the first terminal 11 the figures of the second terminal or other nearby terminals, and select the file needed to be shared and transmit the file to be shared synchronously to the selected nearby terminals.

In conclusion, the system 1 for data sharing according to the current embodiment can recognize automatically the user faces of the nearby terminals, and, after the user face being successfully recognized, transmit automatically the picture file to the nearby terminals that are successfully recognized, eliminating the need of user's manual operations, thereby intelligently transmitting the picture file to the terminals held by the users with the faces present in the picture file. Further, the pairing process between the mobile terminals can be visualized, with simple operations, and face recognition technology is solely utilized to automatically establish connections, which greatly enhances the user experience.

Figure 3:
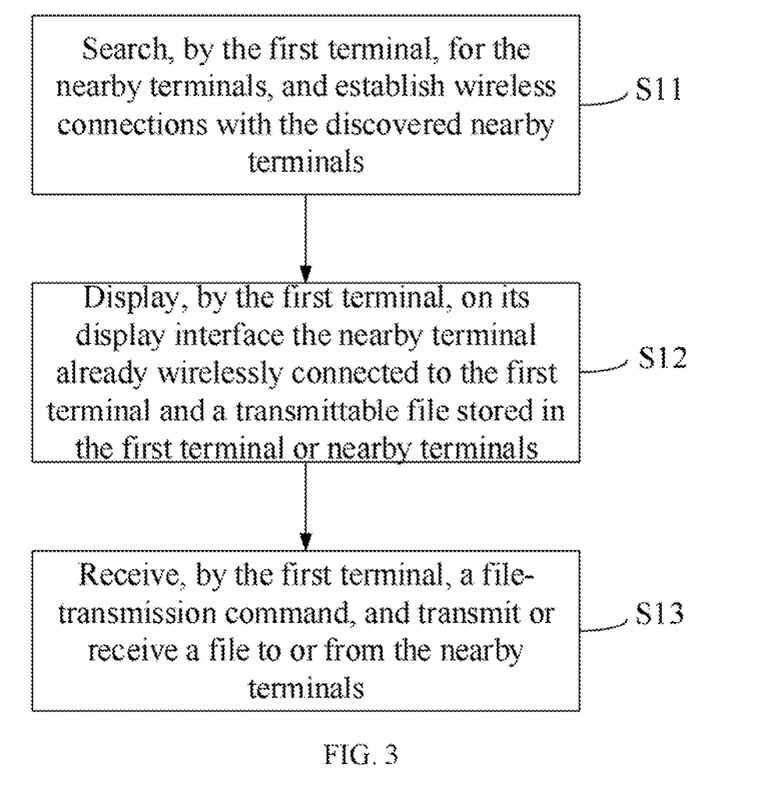
FIG. 3 is a flow chart illustrating a first embodiment of a method for data sharing according to the present disclosure.

Referring now to FIG. 3, a flow chart illustrating a first embodiment of a method for data sharing according to the present disclosure is shown. The method for data sharing disclosed by the current embodiment is implemented based on the system 1 for data sharing illustrated in the first embodiment. The method for data sharing comprises, as is shown in FIG. 3:

S11: searching, by the first terminal 11, for nearby terminals, and establishing wireless connections with the discovered nearby terminals.

The first terminal 11 may search for the nearby terminals in the system 1 for data sharing, where the nearby terminals comprise a second terminal 12, a third terminal 13, . . . , and a nth terminal. The first terminal 11 may connect to the second terminal 12, the third terminal 13, . . . , and the nth terminal, respectively, or establish wireless connections with other nearby terminals via any one or more of the nearby terminals.

The wireless connections may comprise a WIFI Direct connection, a Bluetooth connection or a Wi-Fi connection. The WIFI Direction connection is adopted in the current embodiment to enable a point-to-point wireless connection from one terminal to another or synchronous connections from one terminal to multiple terminals.

S12: displaying, by the first terminal 11, on its display interface the nearby terminals already wirelessly connected to the first terminal 1 and a transmittable file stored in the first terminal or the nearby terminals.

The nearby terminals and the transmittable file stored in the first terminal or the nearby terminals are displayed as figures on the display interface of the first terminal 11. The displayed information of the nearby terminals may comprise any one of a device name, a device type, a user avatar or a user nickname of each of the nearby terminals. The nearby terminals and the transmittable file are displayed as figures on the display interface of the first terminal 11.

S13: receiving, by the first terminal 11, a file-transmission command, and transmitting or receiving the file to or from the nearby terminals.

The first terminal 11 may receive the file-transmission command before transmitting the file to the connected nearby terminals or receiving a file from the connected nearby terminals. In other embodiments, one can also select on the display interface of the first terminal 11 the nearby terminal to which the file needs to be transmitted, and further send the file to the selected nearby terminal.

Figure 4:
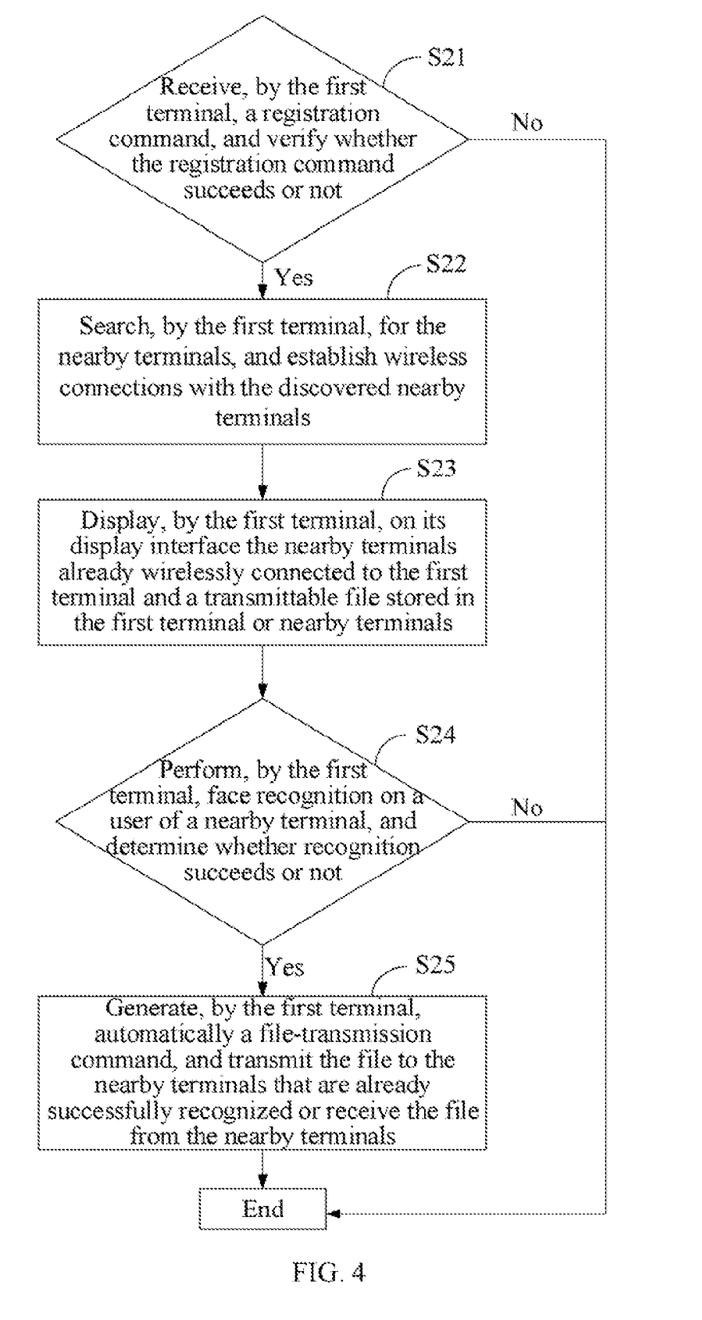
FIG. 4 is a flow chart illustrating a second embodiment of a method for data sharing according to the present disclosure.

Referring now to FIG. 4, which is further described on the basis of embodiment illustrated by FIG. 3. FIG. 4 will also be described based on the system 1 for data sharing, the system 1 comprises the first terminal 11 and the nearby terminals wirelessly connected to the first terminal 11. The first terminal 11 may comprise a communication module 111, a processing module 112, a display module 113 and a camera 114. The processing module 112 is connected to the communication module 111, the display module 113 and the camera 114, respectively. The method for data sharing, as is shown in FIG. 4, comprises:

S21: receiving, by the first terminal 11, a registration command, and verifying whether the registration command succeeds.

If the registration command is successfully verified, then going to step S22; or if not, ending.

The communication module 111 of the first terminal 11 may receive the registration command, and get access to the system 1 for data sharing. Furthermore, the first terminal 11 may verify, via the processing module 112, whether the registration command succeeds. If the processing module 112 verifies that the registration command fails, then the first terminal 11 will not get access to the system 1 for data sharing.

S22: searching, by the first terminal 11, for nearby terminals, and establishing wireless connections with the discovered nearby terminals.

Only when the processing module 112 verifies that the registration command succeeds, can the first terminal 11 get access to the system 1 for data sharing and search in the system 1 for the nearby terminals surrounding the first terminal 11. By the registration command and verification thereof, terminals external to the system 1 can be prevented from connecting to the system 1, so as to avoid information leakage.

In this embodiment, the wireless connections are implemented as a WIFI Direct connection, which can enable a point-to-point direct connection from one terminal to another, and can also enable synchronous connections from one terminal to multiple terminals. In other embodiments, the wireless connection may also be implemented as other connection modes such as a Bluetooth connection, a Wi-Fi connection, etc.

The first terminal 11 may connect via the communication module 111 to each one of the nearby terminals, respectively. Or the communication module 111 of the first terminal 11 may set up a point-to-point wireless connection with the discovered second terminal 12, and thus set up a wireless connection with the third terminal 13 via a point-to-point wireless connection between the second terminal 12 and the third terminal 13. Hence, the first terminal 11 may serve as a repeater, which may connect all the nearby terminals together, in which case the transmission distance will be further increased.

S23: displaying, by the first terminal, on its display interface the nearby terminals already wirelessly connected to the first terminal and a transmittable file store on the first terminal or the nearby terminals.

S24: performing, by the first terminal 11, face recognition on a user of each of the nearby terminals, and determining whether the user is successfully recognized.

The step S23 is similar to step S12 in that the display module 113 of the first terminal 11 displays, in from of figures, the nearby terminals already wirelessly connected to the first terminal 11 and the transmittable file stored in the first terminal or nearby terminals.

In step S24, if the first terminal 11 successfully recognizes the face, then going to step S25; if not, then ending, namely not sending the file to the nearby terminals, so as to avoid mistakenly sending the file to irrelevant terminals which may cause information leakage. The processing module 112 of the first terminal 11 may perform face recognition on users of the nearby terminals, and may further determine whether they are successfully recognized, where the determination is based on comparing against a preset judgment standard to determine whether the recognition succeeds or not.

S25: generating, by the first terminal 11, automatically a file-transmission command, and transmitting the file to the nearby terminals already successfully recognized or receiving the file from the nearby terminals.

After the user face is successfully recognized by the processing module 112, the processing module 112 of the first terminal 11 may further generate automatically the file-transmission command and transmit the file to the nearby terminals already successfully recognized or receive the file from the nearby terminals. The processing module 112 may observe via the camera 114 of the first terminal 11 the faces of the nearby terminals, and determine whether the user faces are present in the file to be transmitted, where this file generally refers to a picture file, which may be a picture saved in the first terminal 11, or a picture freshly taken by the camera 114 of the first terminal 11. If the user face is successfully recognized, then the picture file will be sent to the terminals held by the users with the faces present in the picture file. Or, this file may also be one of other data files. The first terminal 11 may recognize via the camera 114 whether the user faces of the nearby terminals match with the user pictures of the nearby terminals that are displayed on the display module 113. If a user face matches, then it is successfully recognized, and the file will be sent to the nearby terminals already successfully recognized, or the first terminal 11 may receive the file transmitted by the nearby terminals already successfully recognized. In other embodiments, the user may also select manually the nearby terminals that require data sharing, and transmit the data to be shared to the selected nearby terminals.

Figure 5:
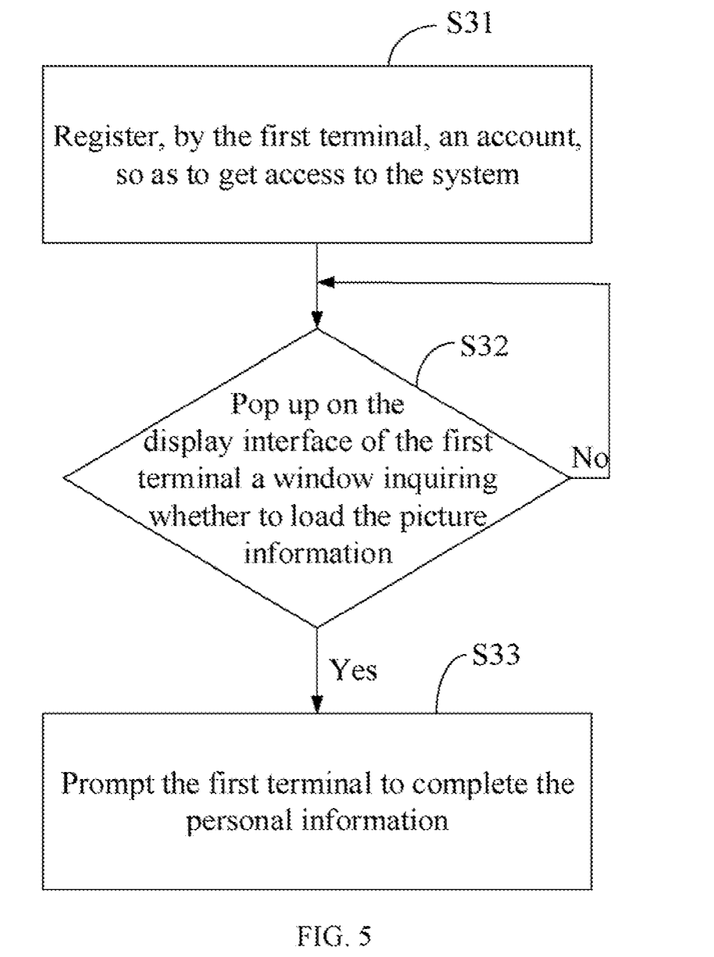
FIG. 5 is a flow chart illustrating user registration with a terminal according to the present disclosure.

Referring now to FIG. 5, a flow chart illustrating user registration on a terminal according to the present disclosure is shown. The flow of user registration with the terminal according to the current embodiment will be described based on the system 1 for data sharing. As is shown in FIG. 5, the flow of user registration on the terminal comprises:

S31: registering, by the first terminal 11, an account, so as to get access to the system 1.

Both the first terminal 11 and the nearby terminals need to be registered in the system 1. Hereinbelow, the registration of the first terminal 11 will be illustrated as an example. The first terminal 11 may register an account in the system 1.

S32: popping up on the display interface of the first terminal 11 a window inquiring whether to load the picture information.

After the first terminal 11 registers the account, the system 1 may pop up on the display interface of the first terminal 11 the window inquiring whether to load the picture information. If the user selects "Yes", then going to step S33; or if the user selects "No", then the display interface may maintain the window inquiring whether to load the picture information within a predetermined time threshold, and cancel the prompting window after the predetermined time threshold such as 30 seconds, and prompt a notification that the personal information is not completed so that access to system 1 is denied. Further, when next time the first terminal 11 attempts to enter the system 1, then the display interface of the first terminal 11 may proceed to pop up the window inquiring whether to load the picture information and require the completion of the personal information before getting access to the system 1.

S33: prompting the first terminal 11 to complete the personal information.

Generally, the user holding the first terminal 11 may upload his personal picture after registering an account, so as to facilitate other users to verify the identity of the terminal's holder. After the user loads the picture information, the display interface of the first terminal 11 may pop up a window for configuring personal information and prompting the user to set a nickname and fill in personal information like his real name, and, when the personal information is completed, prompt a notification of "registration succeeds", only after which can the user get access to the system 1 via this account. In this embodiment, the user may also continue to load up a picture, so as to use the new picture as the avatar as a replacement. Hence, by letting the user register an account and complete the personal information, it can facilitate the user holding the terminal to correctly recognize the identities of other terminal holders, so as to avoid sending by mistake personal information to a terminal holder with an unidentified identity.

In conclusion, the present disclosure uses a first terminal, which is successfully registered, to search for the nearby terminals and establish wireless connections with the discovered nearby terminals, and proceeds to display on the display interface of the first terminal the nearby terminals already wirelessly connected to the first terminal and a transmittable file stored in the first terminal and the nearby terminals, and the first terminal may, when receiving a file-transmission command, transmit the file to the nearby terminals, in addition, the first terminal may also receive the file from the nearby terminals. Operations based on the present disclosure are simple and fast, enabling interconnections of mobile terminals within a close range, and a terminal can transmit a file synchronously to multiple terminals within the system for data sharing, thereby profoundly enhancing the user experience.

Above the preferred embodiments of the present disclosure are described with reference to the accompanying drawings, which, however, are not intended to limit the claimed scope of the present disclosure. Any modifications, equivalent substitutions and improvements made by those of ordinary skill in the art without departing from the scope and spirits of the present disclosure shall all fall within the claimed scope of the disclosure.

The invention claimed is:

1. A method for data sharing, comprising:
receiving, by a first terminal, a registration command;
searching, by the first terminal, when the registration command is verified to be successful, which indicates that the first terminal is successfully registered in a system for data sharing, for a plurality of nearby terminals which are successfully registered in the system, and establishing wireless connections with the nearby terminals discovered, where the first terminal establishes a point-to-point wireless connection with a nearby second terminal discovered, and proceeds to establish a wireless connection with a third terminal via a point-to-point wireless connection between the second terminal and the third terminal;
displaying, by the first terminal, on its display interface the nearby terminals already wirelessly connected to the first terminal and a transmittable file stored in the first terminal or the nearby terminals as figures;
receiving, by the first terminal, a command of transmitting the file, and transmitting or receiving the file to or from the nearby terminals, wherein the file is a picture file, the first terminal performs face recognition on faces in a picture file saved by the first terminal to determine whether a face of the user of each of the nearby terminals is present in the picture file, and when the face of the user of a nearby terminal is present in the picture file, the picture file is transmitted to the terminal held by the user with the face present in the picture file.

2. The method according to claim 1, wherein the wireless connections comprise at least one of a WIFI Direct connection, a Wi-Fi connection, and a Bluetooth connection.

3. The method according to claim 1, wherein the displaying by the first terminal on its display interface the nearby terminals comprises:
displaying, by the first terminal, on its display interface at least one of a device name, a device type, a user avatar and a user nickname of each of the nearby terminals.

4. A method for data sharing, comprising:
receiving, by a first terminal, a registration command;
searching, by the first terminal, when the registration command is verified to be successful, which indicates that the first terminal is successfully registered in a system for data sharing, for a plurality of nearby terminals which are successfully registered in the system, and establishing wireless connections with the nearby terminals discovered;
displaying, by the first terminal, on its display interface the nearby terminals already wirelessly connected to the first terminal and a transmittable file stored in the first terminal or the nearby terminals;
receiving, by the first terminal, a command of transmitting the file, and transmitting or receiving the file to or from the nearby terminals, wherein the file is a picture file, the first terminal performs face recognition on faces in a picture file saved by the first terminal to determine whether a face of the user of each of the nearby terminals is present in the picture file, and when the face of the user of a nearby terminal is present in the picture file, the picture file is transmitted to the terminal held by the user with the face present in the picture file.

5. The method according to claim 4, the step of searching by the first terminal for the nearby terminals and establishing the wireless connections with the nearby terminals discovered comprises:
establishing, by the first terminal, a point-to-point wireless connection with a nearby second terminal discovered, and proceeding to establish a wireless connection with a third terminal via a point-to-point wireless connection between the second terminal and the third terminal.

6. The method according to claim 4, wherein the wireless connections comprise at least one of a WIFI Direct connection, a Wi-Fi connection, and a Bluetooth connection.

7. The method according to claim 4, wherein the nearby terminals and the transmittable file are displayed as figures on the display interface of the first terminal.

8. The method according to claim 4, wherein the displaying by the first terminal on its display interface the nearby terminals comprises:
displaying, by the first terminal, on its display interface at least one of a device name, a device type, a user avatar and a user nickname of each of the nearby terminals.

9. A system for data sharing, comprising a first terminal and a plurality of nearby terminals wirelessly connected to the first terminal, wherein a display interface of the first terminal displays the nearby terminals wirelessly connected to the first terminal and a transmittable file stored in the first terminal or the nearby terminals, and the first terminal is configured to receive a command of transmitting the file and transmit or receive the file to or from the nearby terminals, wherein the file is a picture file, the first terminal performs face recognition on faces in a picture file saved by the first terminal to determine whether a face of the user of each of the nearby terminals is present in the picture file, and when the face of the user of a nearby terminal is present in the picture file, the picture file is transmitted to the terminal held by the user with the face present in the picture file;
wherein the first terminal comprises:
a communication module connected to the nearby terminals and configured to receive a registration command and transmit or receive the file to or from the nearby terminals;
a processing module connected to the communication module, and configured to verify whether the registration command succeeds, and, after verifying that the registration command succeeds, which indicates that the first terminal is successfully registered in a system for data sharing, search for the nearby terminals which are successfully registered in the system and establish wireless connections with the nearby terminals discovered.

10. The system according to claim 9, wherein the first terminal comprises:
a display module connected to the processing module and configured to display the nearby terminals already wirelessly connected to the communication module and a transmittable file stored in the first terminal or the nearby terminals.

11. The system according to claim 10, wherein the communication module is further configured to establish a point-to-point wireless connection with a nearby second terminal discovered, and to proceed to establish a wireless connection with a third terminal via a point-to-point wireless connection between the second terminal and the third terminal.

12. The system according to claim 10, wherein the display module displays, on the display interface of the first terminal, at least one of a device name, a device type, a user avatar and a user nickname of each of the nearby terminals.

\* \* \* \* \*